United States Patent
Okada et al.

(10) Patent No.: US 8,950,650 B2
(45) Date of Patent: Feb. 10, 2015

(54) FRICTION STIR SPOT WELDING DEVICE AND FRICTION STIR SPOT WELDING METHOD

(75) Inventors: Hideki Okada, Kakamigahara (JP); Hajime Kashiki, Kobe (JP); Kazumi Fukuhara, Aakashi (JP); Mitsuo Fujimoto, Kobe (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 0 days.

(21) Appl. No.: 14/005,934

(22) PCT Filed: Mar. 16, 2012

(86) PCT No.: PCT/JP2012/001845
§ 371 (c)(1),
(2), (4) Date: Nov. 21, 2013

(87) PCT Pub. No.: WO2012/127832
PCT Pub. Date: Sep. 27, 2012

(65) Prior Publication Data
US 2014/0069985 A1 Mar. 13, 2014

(30) Foreign Application Priority Data
Mar. 18, 2011 (JP) .................. 2011-060853

(51) Int. Cl.
*B23K 20/12* (2006.01)
(52) U.S. Cl.
CPC ........... *B23K 20/122* (2013.01); *B23K 20/1245* (2013.01); *B23K 20/1255* (2013.01); *B23K 20/126* (2013.01); *B23K 20/1265* (2013.01); *B23K 2201/006* (2013.01); *B23K 2201/18* (2013.01)

USPC ................. 228/102; 228/2.1; 228/8; 228/12; 228/112.1

(58) Field of Classification Search
None
See application file for complete search history.

(56) References Cited

U.S. PATENT DOCUMENTS 5,697,544 A * 12/1997 Wykes ........................... 228/2.1
6,758,382 B1 * 7/2004 Carter ............................ 228/2.1
(Continued)

FOREIGN PATENT DOCUMENTS

JP 2006-167729 A * 6/2006
JP 2006-167793 A * 6/2006
(Continued)

OTHER PUBLICATIONS

International Search Report issued in International Application No. PCT/JP2012/001845 dated Jun. 19, 2013.

*Primary Examiner* — Kiley Stoner
(74) *Attorney, Agent, or Firm* — Oliff PLC

(57) ABSTRACT

A tool driving section of a friction stir spot welding device is configured to cause each of a pin member and a shoulder member to advance and retract, and is controlled by a tool driving control section. A press-fit reference point setting section sets a position where the pin member or the shoulder member contacts an object to be welded as a press-fit reference point, and the tool driving control section controls the position of the pin member with respect to the shoulder member on the basis of the press-fit reference point, thereby controlling the press-fit depth of a rotating tool press-fitted from the surface of the object to be welded. This achieves the excellent welding quality at suitable precision according to welding conditions especially in a double-acting friction stir spot welding method.

16 Claims, 9 Drawing Sheets

(56) References Cited

U.S. PATENT DOCUMENTS

| | | | |
|---|---|---|---|
| 2002/0179682 A1* | 12/2002 | Schilling et al. | 228/112.1 |
| 2006/0124691 A1* | 6/2006 | Wood et al. | 228/2.1 |
| 2006/0169741 A1* | 8/2006 | Smith et al. | 228/2.1 |
| 2006/0289604 A1* | 12/2006 | Zettler et al. | 228/2.1 |
| 2007/0228102 A1* | 10/2007 | Trapp et al. | 228/2.1 |
| 2008/0006677 A1* | 1/2008 | Kumagai et al. | 228/101 |
| 2008/0029581 A1* | 2/2008 | Kumagai et al. | 228/101 |
| 2008/0296350 A1* | 12/2008 | Henneboehle et al. | 228/112.1 |
| 2009/0236045 A1* | 9/2009 | Burton et al. | 156/349 |
| 2009/0308913 A1* | 12/2009 | Hall et al. | 228/112.1 |
| 2010/0084456 A1* | 4/2010 | Carter | 228/112.1 |
| 2010/0163604 A1* | 7/2010 | Noe et al. | 228/114 |
| 2012/0267419 A1* | 10/2012 | Blaski et al. | 228/2.1 |
| 2012/0279043 A1* | 11/2012 | Carter | 29/525.05 |

FOREIGN PATENT DOCUMENTS

| | | | |
|---|---|---|---|
| JP | A-2006-239720 | | 9/2006 |
| JP | 2006-297434 A | * | 11/2006 |
| JP | A-2007-030017 | | 2/2007 |
| JP | A-2008-030050 | | 2/2008 |
| JP | B2-4252403 | | 4/2009 |
| WO | WO 01/28732 A | * | 4/2001 |
| WO | WO-2012/026800 A1 | * | 3/2012 |

* cited by examiner

FRICTION STIR SPOT WELDING DEVICE AND FRICTION STIR SPOT WELDING METHOD

TECHNICAL FIELD

The present invention relates to a friction stir spot welding device and a friction stir spot welding method, and in particular, to a friction stir spot welding device and a friction stir spot welding method that can preferably control advancement and retraction of a rotating tool for friction stir spot welding.

BACKGROUND ART

In transport means such as automobiles, railroad vehicles and airplanes, resistance spot welding or rivet connection has been employed to couple metal materials to each other. However, in recent years, attention has been given to friction stir spot welding as disclosed in Patent Document 1 or 2. According to friction stir spot welding, the metal materials are welded to each other by friction heat with a cylindrical rotating tool (welding tool) having a pin member at its front end. The rotating tool is configured to advanceable and retractable with respect to an object to be welded, and advances at a pressure or speed in a predetermined range while rotating at high speed to be pushed into (press-fitted into) the object to be welded (metal materials). The metal materials are softened at a site where the rotating tool is press-fitted, and the softened metal materials are stirred to weld the object to be welded.

The friction stir spot welding disclosed in Patent Document 1 uses only the pin member as the rotating tool and thus, for convenience of description, will be referred to as single-acting friction stir spot welding. On the other hand, the friction stir spot welding disclosed in Patent Document 2 uses a substantially cylindrical pin member and a substantially tubular shoulder member having a hollow for inserting the pin member thereinto as the rotating tool, and the pin member and the shoulder member can independently rotate, and advance and retract. For convenience of description, the friction stir spot welding of such configuration will be referred to as double-acting friction stir spot welding (refill friction spot joining). According to the double-acting friction stir spot welding, by adjusting timings of advancement and retraction of the pin member and the shoulder member, a recess formed by press-fitting of the pin member can be backfilled.

PRIOR ART DOCUMENTS

Patent Documents

Patent Document 1: Patent Publication No. 4252403
Patent Document 2: Japanese Patent Laid-Open Publication No. 2007-30017

SUMMARY OF THE INVENTION

Problems to be Solved by the Invention

According to the double-acting friction stir spot welding, the rotating tool consists of a plurality of members: the pin member and the shoulder member. Thus, as compared to the single-acting friction stir spot welding, the double-acting friction stir spot welding has more considerations at execution, and it is more difficult to select matters to be controlled at execution and moreover, if the selection is possible, it is more difficult to specifically determine the matters to be controlled. For this reason, a method of controlling the single-acting friction stir spot welding as disclosed in Patent Document 1 cannot be applied as-is to the double-acting friction stir spot welding.

Patent Document 2 describes the double-acting friction stir spot welding capable of preventing or effectively suppressing irregular burrs, but does not disclose the above-mentioned control that can achieve excellent welding quality satisfying welding conditions with high precision.

The present invention is made to solve such problem, and its object is to provide a control technique capable of achieving the excellent welding quality at suitable precision according to welding conditions especially in the double-acting friction stir spot welding method.

Solutions to the Problems

To solve the above-mentioned problem, a friction stir spot welding device according to the present invention is a friction stir spot welding device that welds an object to be welded by partial stirring of a rotating tool, the device including: a cylindrical pin member as the rotating tool, the pin member configured to rotate about an axis and be advanceable and retractable in the axial direction; a tubular shoulder member configured to surround the pin member, rotate coaxially with the pin member, and be advanceable and retractable in the axial direction; a tool driving section configured to cause each of the pin member and the shoulder member to advance and retract along the axis; a press-fit reference point setting section configured to set a position where the shoulder member or the pin member contacts the object to be welded, as a press-fit reference point; and a tool driving control section configured to control the action of the tool driving section, wherein the tool driving control section controls a relative position of the pin member with respect to the shoulder member or a relative position of the shoulder member with respect to the pin member on the basis of the press-fit reference point set by the press-fit reference point setting section, thereby controlling a press-fit depth of the pin member or the shoulder member press-fitted from a surface of the object to be welded.

The friction stir spot welding device may further include a displacement calculating section configured to calculate quantity of displacement as displacement of a front end of the pin member or the shoulder member, wherein the tool driving control section may be configured to correct the press-fit depth with the quantity of displacement.

The friction stir spot welding device may further include a clamp member located outside the shoulder member, the clamp member being configured to press the object to be welded from the surface; a clamp position-rotating tool position detecting section configured to detect the position of a front end of the clamp member; and a clamp-tool distance calculating section configured to calculate a distance between the front end of the clamp member, which is detected by the clamp position-rotating tool position detecting section, and the front end of the pin member or the shoulder member, and the tool driving control section may be configured to adjust the press-fit depth on the basis of the distance calculated by the clamp-tool distance calculating section.

The friction stir spot welding device may further include a memory section, and the memory section may be configured to store pressurizing force adjusting data for adjusting pressurizing force of the rotating tool press-fitted into the object to be welded, and the tool driving control section may be configured to read the pressurizing force adjusting data from the memory section to control the pressurizing force.

In the friction stir spot welding device, the pressurizing force adjusting data as a value of a current applied to a motor of the tool driving section may be stored in the memory section, and the tool driving control section may be configured to adjust the current value to control the pressurizing force.

In the friction stir spot welding device, the memory section may individually store the pressurizing force adjusting data in each of a press-fit action of press-fitting the pin member into the object to be welded, a pull-out action of pulling the pin member out of the object to be welded, and stopped state of the pin member, and the tool driving control section may be configured to determine whether the action of the pin member is the press-fit action, the pull-out action, or the stopped state, and read the pressurizing force adjusting data corresponding to the determined action from the memory section to control the tool driving section.

To solve the above-mentioned problem, a friction stir spot welding method according to the present invention is a friction stir spot welding method using a cylindrical pin member configured to rotate about an axis and be advanceable and retractable in the axial direction, and a tubular shoulder member configured to surround the pin member, rotate coaxially with the pin member, and be advanceable and retractable in the axial direction, in a state where the pin member and the shoulder member are advanceable and retractable, to weld an object to be welded having a front surface facing the pin member and the shoulder member by partial stirring, wherein a position where the pin member or the shoulder member contacts the object to be welded is set as a press-fit reference point, and a relative position of the pin member with respect to the shoulder member or a relative position of the shoulder member with respect to the pin member is controlled on the basis of the press-fit reference point, thereby controlling a press-fit depth of the pin member or the shoulder member press-fitted from a surface of the object to be welded.

According to the friction stir spot welding method, quantity of displacement as displacement of a front end of the pin member or the shoulder member may be calculated, and the press-fit depth may be corrected with the quantity of displacement.

According to the friction stir spot welding method, the surface of the object to be welded may be pressed by a clamp member located outside the shoulder member, and a distance between a front end of the clamp member and a front end of the pin member or the shoulder member may be calculated, and the press-fit depth may be adjusted on the basis of the distance.

According to the friction stir spot welding method, pressurizing force adjusting data for adjusting pressurizing force of the pin member press-fitted into the object to be welded may be stored in a memory section, and the pressurizing force adjusting data may be read from the memory section to control the pressurizing force.

The above-mentioned and other objects, features, and advantages of the present invention will be apparent from following detailed description of preferred Embodiments with reference to appended figures.

Effects of the Invention

As described above, according to the present invention, especially in the double-acting friction stir spot welding, a control technique capable of achieving excellent welding quality with suitable precision according to welding conditions can be provided.

EMBODIMENTS OF THE INVENTION

Preferred Embodiments of the present invention will be described below with reference to figures. Throughout the figures, the same or equivalent elements are given the same reference signs and overlapping description thereof is omitted.

Embodiment 1

[Friction Stir Spot Welding Device]

A basic configuration of a friction stir spot welding device in accordance with Embodiment 1 of the present invention will be described with reference to FIG. 1.

Figure 1:
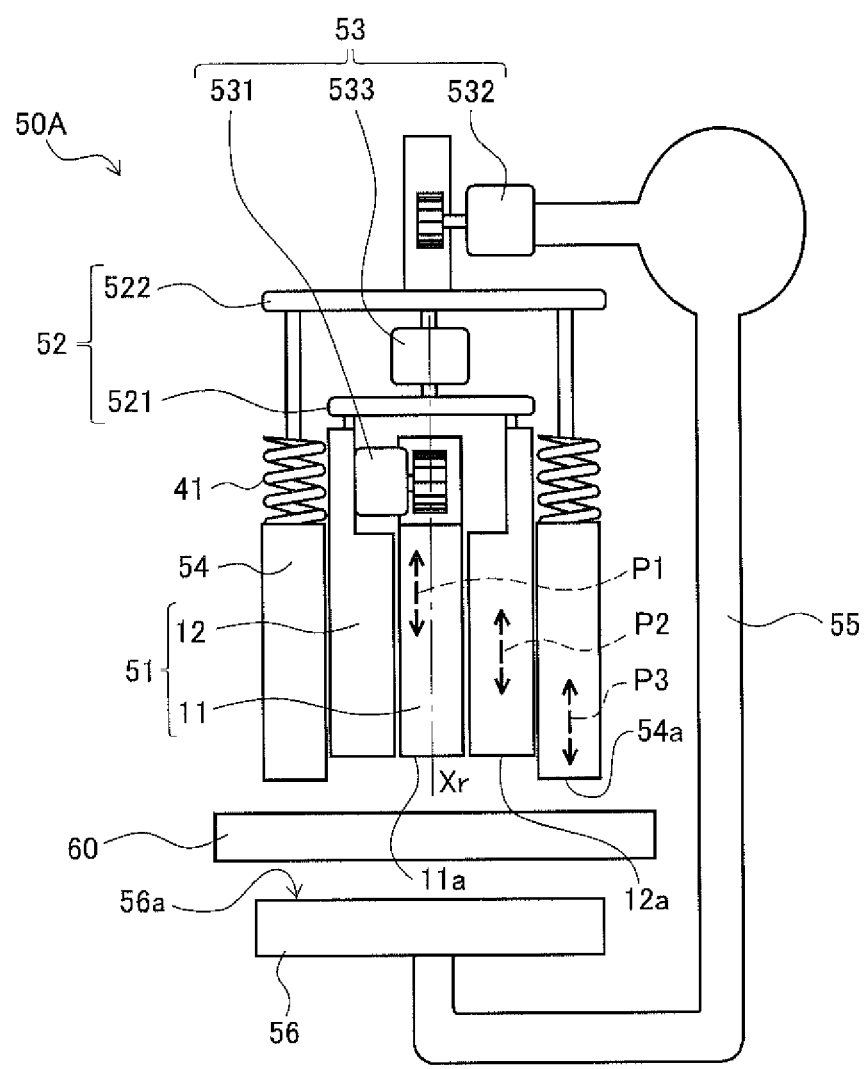
FIG. 1 is a schematic side view showing an example of configuration of a friction stir spot welding device in accordance with Embodiment 1 of the present invention.

As shown in FIG. 1, a friction stir spot welding device 50A in accordance with this embodiment includes a rotating tool 51, a tool fixing section 52, a tool driving section 53, a clamp member 54, a lining support section 55, and a lining member 56.

The rotating tool 51 is supported by the tool fixing section 52, and driven to advance and retract and rotate by the tool driving section 53. The rotating tool 51, the tool fixing section 52, the tool driving section 53, and the clamp member 54 are provided above the lining support section 55 constituted as a C-gun (C-type frame), and the lining member 56 is provided below the lining support section 55. Accordingly, the rotating tool 51 and the lining member 56 are attached to the lining support section 55 as opposed to each other, and an object to be welded 60 is arranged between the lining member 56 and the rotating tool 51.

The rotating tool 51 consists of a pin member 11 and a shoulder member 12. The tool fixing section 52 consists of a rotating tool fixing section 521 and a clamp fixing section 522, and the tool driving section 53 consists of a pin driving section 531, a shoulder driving section 532, a rotational driving section 533, and a clamp driving section 41. The clamp member 54 is fixed to the clamp fixing section 522 via the clamp driving section 41. The clamp driving section 41 is formed of a spring.

The pin member 11 is substantially tubular or cylindrical, and although not shown in detail, is supported by the rotating tool fixing section 521. The pin member 11 is rotated about an axis Xr (a rotary axis represented by a dot-and-dash line in the figure) by the rotational driving section 533, and can be advanced and retracted along a dashed arrow 11 or the axis Xr (in the vertical direction in FIG. 1) by the pin driving section 531. The shoulder member 12 is shaped substantially like a hollow tube, and the pin member 11 is inserted into the hollow tube, so that the rotating tool fixing section 521 supports the shoulder member 12 outside the pin member 11 so as to surround the pin member 11. The shoulder member 12 is rotated about the same axis Xr as the rotary axis of the pin member 11 by the rotational driving section 533, and can be advanced and retracted along a dashed arrow P2 or the axis Xr by the shoulder driving section 532.

In this manner, both of the pin member 11 and the shoulder member 12 are supported by the rotating tool fixing section 521 in this embodiment, and are integrally rotated about the axis Xr by the rotational driving section 533. Further, the pin member 11 and the shoulder member 12 each can be advanced and retracted along the axis Xr by the pin driving section 531 and the shoulder driving section 532. With the configuration shown in FIG. 1, the pin member 11 can advance and retract alone and with advancement and retraction of the shoulder member 12; however, the pin member 11 and the shoulder member 12 can independently advance and retract.

The clamp member 54 is provided outside the shoulder member 12, and like the shoulder member 12, is shaped substantially like a hollow tube, and the shoulder member 12 is inserted into the hollow. Accordingly, the substantially tubular shoulder member 12 is located on the periphery of the pin member 11, and the substantially tubular clamp member 54 is located on the periphery of the shoulder member 12. In other words, the clamp member 54, the shoulder member 12, and the pin member 11 are coaxially nested.

The clamp member 54 presses the object to be welded 60 from one surface (front surface), and in this embodiment, is supported by the clamp fixing section 522 via the clamp driving section 41. Accordingly, the clamp member 54 is biased toward the lining member 56. The clamp fixing section 522 supports the rotating tool fixing section 521 via the rotational driving section 533. The clamp fixing section 522 can be advanced and retracted along a dashed arrow P3 (having the same directions as those of the dashed arrows P1 and P2) by the shoulder driving section 532. The clamp driving section 41 is not limited to the spring, and may be any means for biasing or pressurizing force the clamp member 54, for example, a mechanism using gas pressure, hydraulic pressure, or servo motor. The clamp driving section 41 may be advanced and retracted by the shoulder driving section 532 as shown in FIG. 1, or may be independently advanced and retracted irrespective of the shoulder driving section 532.

As described above, the rotating tool 51, the tool fixing section 52, the tool driving section 53, and the clamp member 54 are provided on the lining support section 55 as opposed to the lining member 56. The pin member 11 and the shoulder member 12, which constitute the rotating tool 51, and the clamp member 54 include a contact surface 11a, a contact surface 12a, and a contact surface 54a, respectively, and these contact surfaces 11a, 12a, 54a can be advanced and retracted by the tool driving section 53, and contact a front surface (first surface, one surface) of the object to be welded 60 arranged between the contact surfaces and the lining member 56. The lining member 56 is opposed to the pin member 11 and the shoulder member 12, and the clamp member 54, and contacts a back surface of the object to be welded 60. In FIG. 1, the lining member 56 has a flat surface that conforms to the back surface of the flat plate-like object to be welded 60.

The lining member 56 is located on the side, toward which the pin member 11 and the shoulder member 12 advance, and a support surface 56a of the lining member 56 supports the back surface of the object to be welded 60 in the state where the front surface of the object to be welded 60 faces the pin member 11 and the shoulder member 12. The lining member 56 may be configured in any manner as long as it can properly support the object to be welded 60 for friction stir spot welding. The lining member 56 is generally a flat plate having the support surface 56a that can stably support the plate-like object to be welded 60, but may have any configuration other than the flat plate according to the shape of the object to be welded 60. For example, the lining members 56 of plural different shapes may be prepared separately, and the lining member 56 may be removable from the lining support section 55 to be replaced with one of the prepared lining members 56 according to the type of the object to be welded 60.

Specific configurations of the rotating tool 51, the tool fixing section 52, and the tool driving section 53 in this embodiment are not limited to the above-mentioned configurations, and may be any configuration well known in the field of friction stir spot welding. For example, the pin driving section 531, the shoulder driving section 532, and the rotational driving section 533, which constitute the tool driving section 53 in this embodiment, each are formed of a motor and gear mechanism well known in the field of friction stir spot welding. In the friction stir spot welding device 50A, the clamp member 54 may be omitted, or may be removable from the lining support section 55 as needed. Other members not shown in FIG. 1 may be included.

The lining support section 55 is formed of a C-gun in this embodiment, but is not limited to this as long as it can support the pin member 11 and the shoulder member 12 so as to allow them to advance and retract, as well as support the lining member 56 at a position opposed to the rotating tool 51.

In this embodiment, the lining support section 55 is attached to a front end of an arm not shown. The arm is included in a friction stir spot welding robot not shown in FIG. 1. Thus, the lining support section 55 can be deemed to be included in the friction stir spot welding robot. The configuration of the friction stir spot welding robot, including the lining support section 55 and the arm, is not specifically limited, and any configuration well known in the field of the friction stir spot welding, such as a multiple joint robot, can be preferably used.

The friction stir spot welding device 50A including the lining support section 55 is not applied only to the friction stir spot welding robot. For example, the friction stir spot welding device 50A can be preferably applied to well-known processing machines such as NC machine tools, large C frames, and auto-riveters. Two pairs or more of robots may be used such that the friction stir spot welding device confronts the lining member 56. Providing that the object to be welded 60 can be stably subjected to friction stir spot welding, a friction stir spot welding device can be applied as a handheld configuration in contrast with the stationary friction stir spot welding device 50A in this embodiment, or a robot can be used as a positioner for the object to be welded 60.

[Friction Stir Spot Welding Method]

Next, a specific process of a friction stir spot welding method using the above-mentioned friction stir spot welding device 50A will be described with reference to FIG. 2A to FIG. 2F and FIG. 3A to FIG. 3F. In FIG. 2A to FIG. 2F and FIG. 3A to FIG. 3F, two metal plates 61, 62 are used as the object to be welded 60, and these metal plates 61, 62 are stacked and coupled to each other by spot welding.

In FIG. 2A to FIG. 2F and FIG. 3A to FIG. 3F, an arrow p represents a direction in which the rotating tool 51 is moved (corresponding to the direction represented by the dashed arrow P1 to P2 in FIG. 1), an arrow r represents a direction in which the rotational members (the pin member 11 and the shoulder member 12) are rotated, and a block arrow F represents a direction in which a force is exerted on the metal plates 61, 62. In FIG. 2A to FIG. 2F and FIG. 3A to FIG. 3F, for clearly describing the position of the constituents in each step and the welding site of the metal plates 61, 62, as to the arrow p and the block arrow F, the reference numerals "p" and "F" are expressed in only FIG. 2A, and as to the arrow r, the reference numeral "r" is expressed in only FIG. 2B. Although a force is exerted also from the lining member 56 to the metal plates 61, 62, for convenience of description, the force is not shown in FIG. 2A to FIG. 2F. Further, to distinguish the shoulder member 12 from the pin member 11 and the clamp member 54, the shoulder member 12 is halftone-hatched.

First, a series of steps in FIG. 2A to FIG. 2F will be described. In the series of steps, the pin member 11 is press-fitted into the metal plates 61, 62 before the shoulder member 12 is.

Figure 2A:
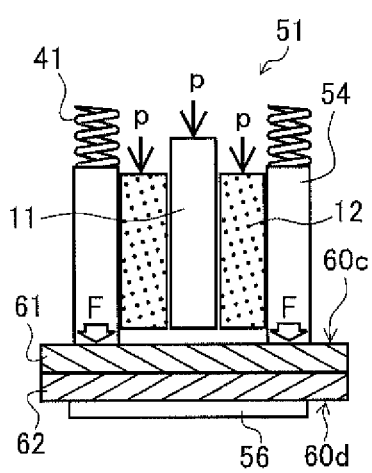
FIG. 2A to FIG. 2F are process charts schematically showing an example of each stage of friction stir spot welding by the friction stir spot welding device in FIG. 1.

Specifically, as shown in FIG. 2A, the rotating tool 51 is made close to the metal plates 61, 62 (the arrow p in this figure) to bring the contact surface 54a (not shown in FIG. 2A to FIG. 2F) of the clamp member 54 into contact with a front surface 60e of the upper metal plate 61, and to bring the lining member 56 into contact with a back surface 60d of the lower metal plate 62. As a result, the clamp member 54 and the lining member 56 sandwich the metal plates 61, 62 therebetween, and pressure from the clamp member 54 (the block arrow F in this figure) generates a clamping force.

Figure 2B:
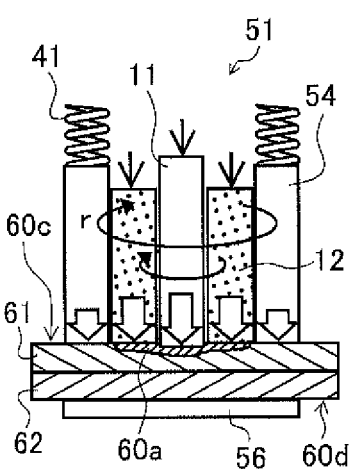

Next, as shown in FIG. 2B, the rotational members of the rotating tool 51 come close to the metal plates 61, 62, bringing the contact surface 11a (not shown in FIG. 2A to FIG. 2F) of the pin member 11 and the contact surface 12a (not shown in FIG. 2A to FIG. 2F) of the shoulder member 12 into contact with the front surface 60c of the metal plate 61. In this state, contraction of the clamp driving section 41 formed of the spring generates the clamping force of the clamp member 54. Then, the pin member 11 and the shoulder member 12 are brought into contact with the front surface 60c of the metal plate 61, and are rotated (about the arrow r in this figure).

In this state, since both of the pin member 11 and the shoulder member 12 do not advance nor retract, the front surface 60c of the metal plate 61 is "preheated". Thereby, the metal material in a contact area of the metal plate 61 is softened by heat generated by friction, forming a plastic flowing portion 60a near the front surface 60c of the metal plate 61.

Figure 2C:
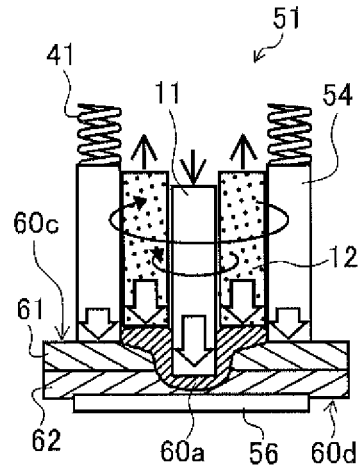

Next, as shown in FIG. 2C, the pin member 11 is projected from the shoulder member 12 by the pin driving section 531 not shown, thereby further advancing (pressing) the pin member 11 inwards from the front surface 60c of the metal plate 61. At this time, the softened region of the metal material ranges from the upper metal plate 61 to the lower metal plate 62 to increase the plastic flowing portion 60a. Since the softened metal material of the plastic flowing portion 60a is further pushed aside by the pin member 11 and flows from immediately below the pin member 11 to immediately below the shoulder member 12, the shoulder member 12 retracts and floats upward when viewed from the pin member 11.

Figure 2D:
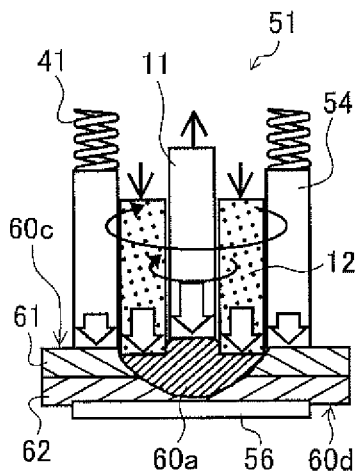

Next, as needed, as shown in FIG. 2D, a step where the pin member 11 protruded by the pin driving section 531 not shown is gradually retracted (drawn), and with the retraction of the pin member 11, the shoulder member 12 is advanced into (press-fitted into) the metal plate 61 may be performed.

In a below-mentioned step in FIG. 2E, the front surface 60c of the metal plate 61 is shaped. However, if the front surface 60c is not sufficiently shaped at this time, the step shown in FIG. 2D may be performed.

After that, after the step in FIG. 2C, the pin member 11 is gradually retracted, and after the step in FIG. 2D, the shoulder member 12 is gradually retracted. At this time, as represented by the block arrows in FIG. 2C and FIG. 2D, even during retraction of the pin member 11 or the shoulder member 12, the pressurizing force from its front end is maintained. In the former case, since rotation and pressure of the shoulder member 12 is maintained while the pin member 11 is retracted, the softened metal material of the plastic flowing portion 60a flows from immediately below the shoulder member 12 to immediately below the pin member 11, backfilling the recess. In the latter case, since rotation and pressure by the pin member 11 is maintained while the shoulder member 12 is retracted, the recess caused by press-fit of the shoulder member 12 is backfilled.

Figure 2E:
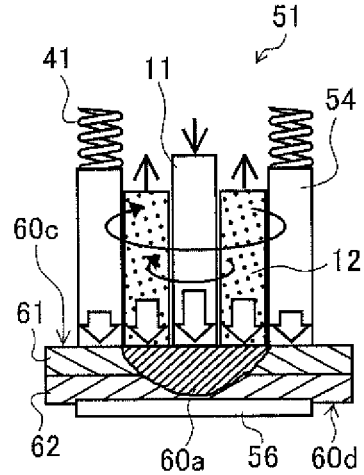

After that, as shown in FIG. 2E, the contact surface 11a of the pin member 11 is aligned with (flush with) the contact surface 12a of the shoulder member 12 without any substantial step therebetween. Thereby, the front surface 60c of the metal plate 61 is shaped to achieve an almost flat surface without any substantial recess.

Figure 2F:
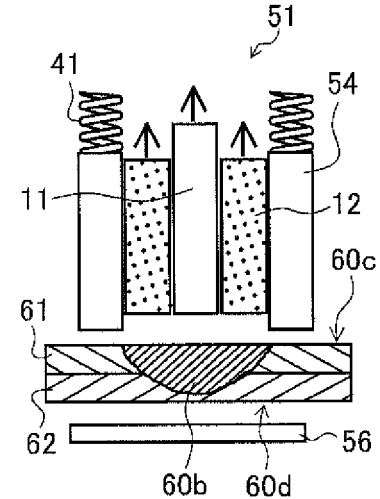

Finally, as shown in FIG. 2F, the rotating tool 51 and the lining member 56 are separated from the metal plates 61, 62 to finish the series of friction stir spot welding. At this time, rotation (and pressure) caused by contact with the rotating tool 51 is no longer transmitted to the metal plates 61, 62. Thus, plastic flow of the plastic flowing portion 60a extending on both the metal plates 61, 62 is stopped, and becomes a welded portion 60b. As a result, the two metal plates 61, 62 are coupled to each other with the welded portion 60b.

Next, a series of steps in FIG. 3A to FIG. 3F will be described. In the series of steps, the shoulder member 12 is press-fitted into the metal plates 61, 62 before the pin member 11 is. In FIG. 3A to FIG. 3F, the lining member 56 also exerts a force to the metal plates 61, 62, but for convenience of description, the force is not shown.

Figure 3A:
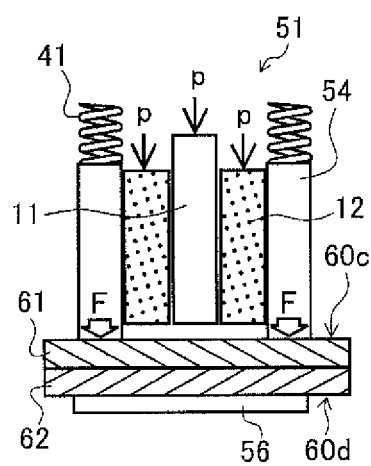
FIG. 3A to FIG. 3F are process charts schematically showing another example of each stage of friction stir spot welding by the friction stir spot welding device in FIG. 1.
Figure 3B:
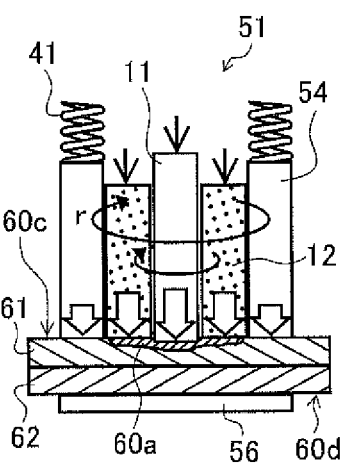
Figure 3C:
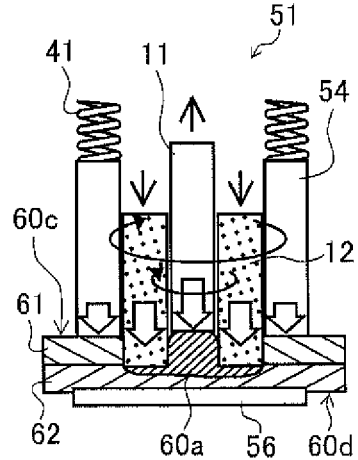

Since steps in FIG. 3A and FIG. 3B are the same as the steps in FIG. 2A and FIG. 2B, description thereof is omitted. Next, as shown in FIG. 3C, by protruding the shoulder member 12 further from the pin member 11 by the shoulder driving section 532 not shown, the shoulder member 12 is further advanced inwards (press-fitted into) from the front surface 60c of the metal plate 61. Thus, the plastic flowing portion 60a ranges from the upper metal plate 61 to the lower metal plate 62, the softened metal material of the plastic flowing portion 60a is pushed aside by the shoulder member 12 to flow from immediately below the shoulder member 12 to immediately below the pin member 11, resulting in that the pin member 11 retracts and floats upward when viewed from the shoulder member 12.

Figure 3D:
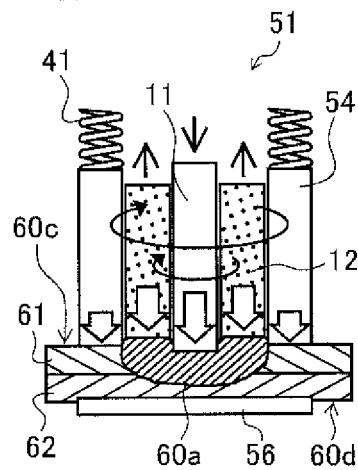

Next, as needed, as shown in FIG. 3D, a step where the protruding shoulder member 12 is gradually retracted (drawn), and with the retraction, the pin member 11 is advanced (press-fitted) into the metal plate 61 may be performed. Then, after the step in FIG. 3C, the shoulder member 12 is gradually retracted, and after the step in FIG. 3D, the pin member 11 is gradually retracted. This backfills the recess generated by press-fit of the shoulder member 12 or the pin member 11.

Figure 3E:
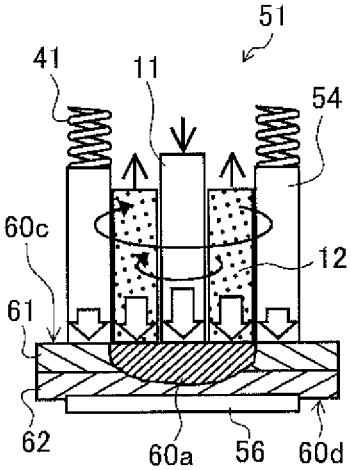
Figure 3F:
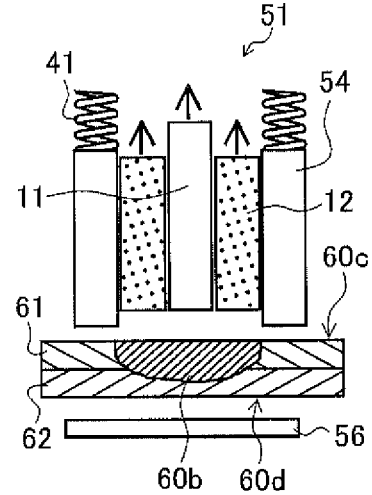

After that, as shown in FIG. 3E, the contact surface 11a of the pin member 11 is aligned with (flush with) the contact surface 12a of the shoulder member 12 without any substantial step therebetween. Finally, as shown in FIG. 3F, the rotating tool 51 and the lining member 56 are separated from the metal plates 61, 62 to finish the series of friction stir spot welding.

In this embodiment, the stage shown in FIG. 2A or FIG. 3A is referred to as a "preparation stage" of friction stir spot welding, the stage in FIG. 2B or FIG. 3B is referred to as a "pre-heating stage". In the stage shown in FIG. 2C to FIG. 2E or FIG. 3C to FIG. 3E, a press-fit depth (press-fit/pull-out depth or advance/retract depth) of the pin member 11 or the shoulder member 12 is controlled by controlling the relative position of the pin member 11 with respect to the shoulder member 12 (or the relative position of the shoulder member 12 with respect to the pin member 11). Accordingly, these stages are referred to as a "tool control stage". The stage shown in FIG. 2F or FIG. 3F is referred to as a "completion stage" of friction stir spot welding.

In this embodiment, as the "tool control stage", three stages in total: a stage in FIG. 2C or FIG. 3C, a stage in FIG. 2D or FIG. 3D, and a stage in FIG. 2E or FIG. 3E are executed. For convenience of description, each of these stages is given a specific stage name. Specifically, the stage in FIG. 2C or FIG. 3C is referred to as a "press-fit stage", the stage in FIG. 2D or FIG. 3D is referred to as a "backfill stage", and the stage in FIG. 2E or FIG. 3E is referred to as a "shaping stage".

In this embodiment, the press-fit stage, the backfill stage, and the shaping stage are illustrated as the tool control stage and however, as described above, the tool control stage may be at least the press-fit stage and the shaping stage. The backfill stage is the tool control stage performed as needed and thus, may be omitted. A tool control stage including four or more stages is possible.

As described above, the friction stir spot welding device 50A includes the pin member 11 and the shoulder member 12 as the rotating tool 51, and the rotating tool 51 partially stirs the object to be welded 60 (the metal plates 61, 62 in this example) to weld the object to be welded 60. Since the two members of the rotating tool 51 can consecutively perform the stages shown in FIG. 2A to FIG. 2F or FIG. 3A to FIG. 3F, as compared to single-acting friction stir spot welding, irregularity in the front surface 60c of the object to be welded 60 can be reduced as much as possible by backfilling of the recess.

[Control Configuration of Friction Stir Spot Welding Device]

Next, control configuration of the friction stir spot welding device 50A, which serves to perform the series of stages in friction stir spot welding, will be specifically described with reference to FIG. 4.

Figure 4:
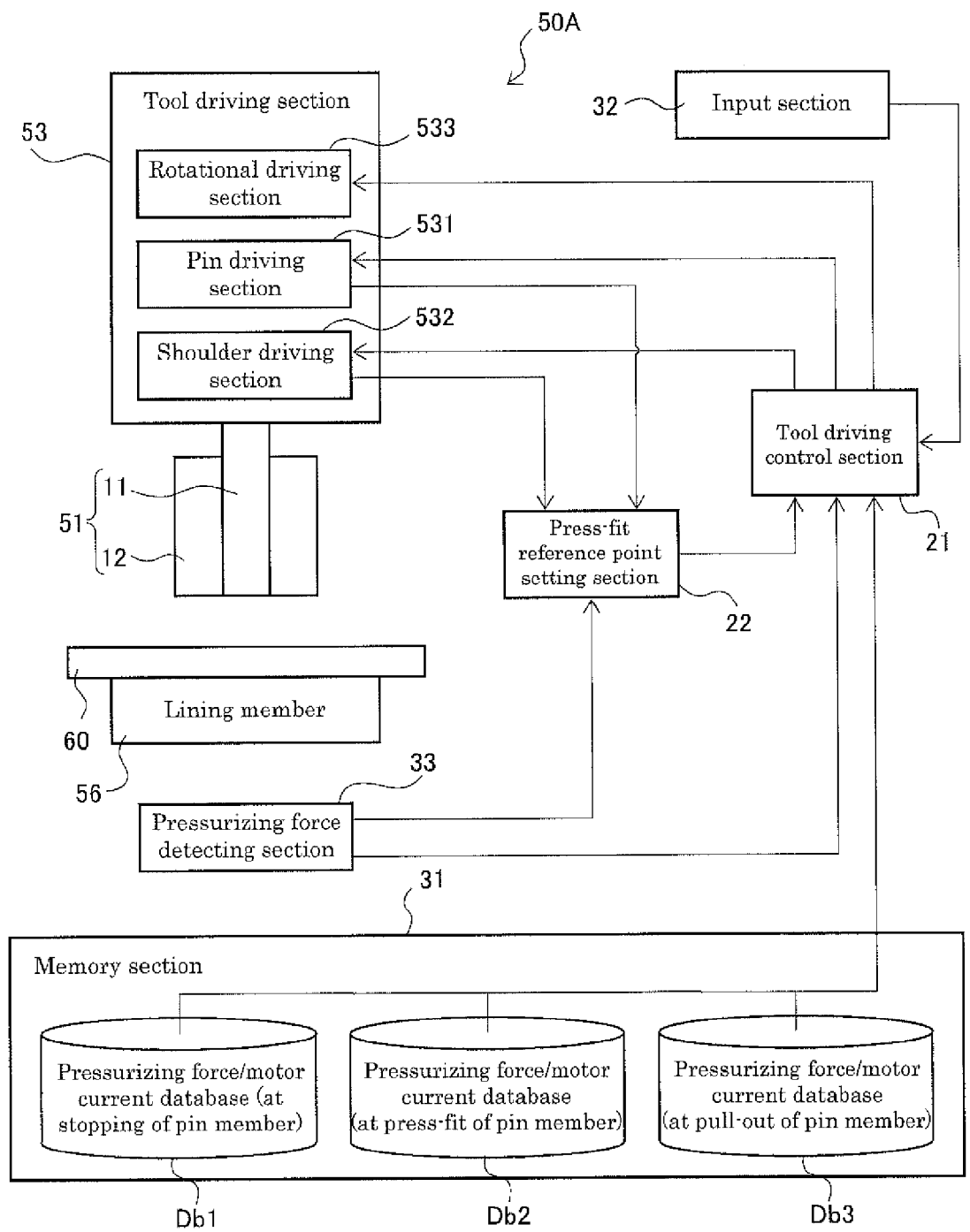
FIG. 4 is a block diagram showing functional configuration of the friction stir spot welding device shown in FIG. 1.

As shown in FIG. 4, the friction stir spot welding device 50A further includes a tool driving control section 21, a press-fit reference point setting section 22, a memory section 31, an input section 32, and a pressurizing force detecting section 33.

The tool driving control section 21 controls the tool driving section 53. That is, the tool driving control section 21 controls the pin driving section 531, the shoulder driving section 532, and the rotational driving section 533, which constitute the tool driving section 53, to control switching between advancement or retraction of the pin member 11 and the shoulder member 12, and the position of the front ends, moving speed, and moving direction of the pin member 11 and the shoulder member 12 during advancement or retraction. In this embodiment, the tool driving control section 21 controls the tool driving section 53 on the basis of the reference point set by the press-fit reference point setting section 22, thereby controlling the relative position of the front end of the pin member 11 with respect to the front end of the shoulder member 12.

The press-fit reference point setting section 22 serves to set the position where the pin member 11 or the shoulder member 12 contacts the object to be welded 60, as the press-fit (pushing) reference point of the pin member 11 or the shoulder member 12. The pin member 11 or the shoulder member 12 stays on the front surface 60c of the object to be welded 60 for a short but certain period until the material becomes softened. Then, for the shoulder member 12, the press-fit reference point setting section 22 derives the position where the shoulder member 12 contacts the object to be welded 60 and stays there for a certain period from positional information of the shoulder member 12 (such as the moving speed obtained by an encoder), which is obtained from the tool driving control section 21, and sets the derived position as a press-fit reference point. The press-fit reference point becomes a reference point for the press-fit depth at press-fit of the pin member 11 and the shoulder member 12 into the object to be welded 60. The press-fit reference point for the pin member 11 is set in the same manner.

As a matter of course, the press-fit reference point setting section 22 may set the position offset from the front surface 56a of the lining member 56 by a nominal or pre-measured thickness of the object to be welded 60, as the press-fit reference point, and in this case, operations of measuring and inputting the thickness are required. When the position offset from the front surface 56a of the lining member 56 by the nominal or pre-measured thickness of the object to be welded 60 is set as the press-fit reference point, since the pin member 11 or the shoulder member 12 contacts the material with considerable pressurizing force, it is necessary to consider deformation of the friction stir spot welding device 50A due to the pressurizing force. Further, deviation in length, which is caused by thermal expansion of the pin member 11 and the shoulder member 12 during preheating, can occur as an error. When the position where the shoulder member 12 (rotating tool 51) contacts the object to be welded 60 and stays there for a certain period is set as the press-fit reference point, deformation of the friction stir spot welding device 50A, deformation of the object to be welded 60, and deviation in length due to thermal expansion of the pin member 11 and the shoulder member 12 can be eliminated.

Configuration of the tool driving control section 21 and the press-fit reference point setting section 22 is not specifically limited and in this embodiment, the tool driving control section 21 is formed of the CPU in the microcomputer, and makes calculation on the action of the tool driving section 53, and the press-fit reference point setting section 22 is configured as a function of the tool driving control section 21. That is, the CPU as the tool driving control section 21 may operate according to a program stored in the memory section 31 or another memory section to realize the press-fit reference point setting section 22.

As long as the press-fit reference point setting section 22 can set the press-fit reference point on the basis of the motor rotational information (for example, motor rotational angle or rotational speed) generated by the tool driving control section 21, it is not necessarily a function of the tool driving control section 21. For example, the press-fit reference point setting section 22 may be configured as a well-known logical circuit or like including a switching element, a subtractor, or a comparator, etc.

The memory section 31 readably stores various types of data, and in this embodiment, as shown in FIG. 4, stores pressurizing force/motor current databases Db1 to Db3. The tool driving control section 21 uses the pressurizing force/motor current databases Db1 to Db3 to control the tool driving section 53.

The memory section 31 is formed of a storage device such as a well-known memory, a hard disc, or the like. The memory section 31 is not necessarily a single unit, and may be formed of a plurality of storage devices (for example, a random access memory and a hard disc drive). When the tool driving control section 21 is a microcomputer, at least a part of the memory section 31 may be configured as an internal memory in the microcomputer, or as an independent memory. The memory section 31 may store data other than the databases, and read the data from any section other than the tool driving control section 21. As a matter of course, data may be written from the tool driving control section 21 or so on.

The input section 32 enables inputting of various parameters on the control of friction stir spot welding and other data into the tool driving control section 21, and is formed of a well-known input device such as a keyboard, a touch panel, or a button switch. In this embodiment, at least welding conditions for the object to be welded 60, for example, data on the thickness and the material of the object to be welded 60 can be inputted by the input section 32.

When the rotating tool 51 (the pin member 11, the shoulder member 12, or the both) contacts or is press-fitted into the object to be welded 60, the pressurizing force detecting section 33 detects the pressurizing force exerted on the object to be welded 60 from the rotating tool 51. In this embodiment, a load cell is used as the pressurizing force detecting section 33. However, the pressurizing force detecting section 33 is not limited to the load cell, and may be any well-known pressurizing force detector.

It is noted that, in the friction stir spot welding device 50A in accordance with Embodiment 1, the pressurizing force detecting section 33 is not essential constitute, but used to acquire the pressurizing force/motor current databases Db1 to Db3 stored in the memory section 31, and can be used as redundant information of the press-fit reference point setting section 22, enhancing convenience in controlling driving of the rotating tool 51. The tool driving control section 21 may be used for feedback control from the pressurizing force detecting section 33 in place of the pressurizing force/motor current databases Db1 to Db3.

[Control by Tool Driving Control Section]

Next, control of the tool driving section 53 by the tool driving control section 21, in particular, control of the relative position of the front end of the pin member 11 with respect the front end of to the shoulder member 12 on the basis of the press-fit reference point, and control of the press-fit depth of the rotating tool 51 will be described specifically with reference to FIG. 5, FIG. 6A and FIG. 6B.

Figure 5:
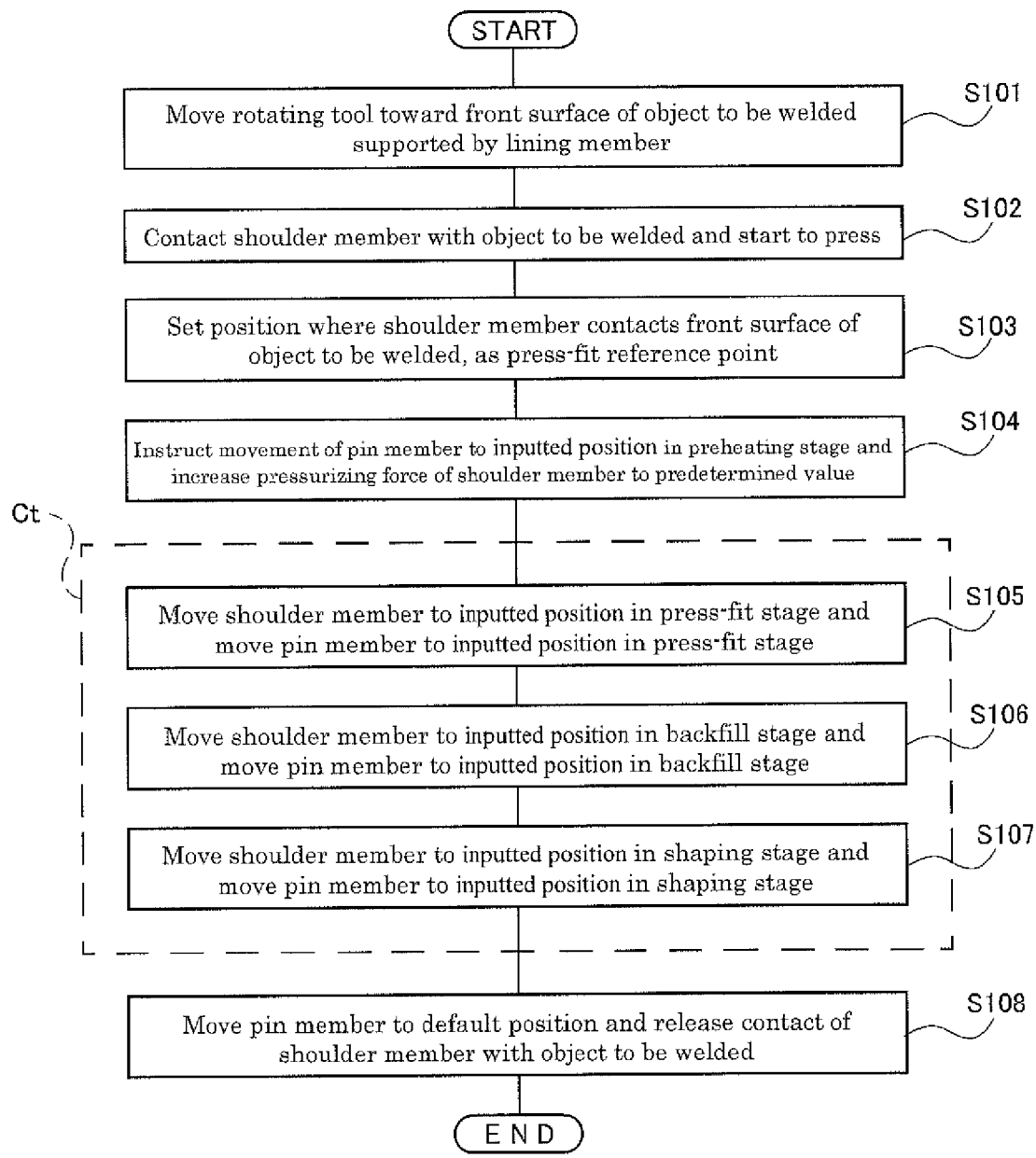
FIG. 5 is a flow chart showing an example of control of friction stir spot welding in the friction stir spot welding device in FIG. 4.

First as shown in FIG. 5, the tool driving control section 21 controls the tool driving section 53 to cause the rotating tool 51 to move toward the front surface 60c of the object to be welded 60 supported by the lining member 56 (Step S101). Since this stage corresponds to the preparation stage (refer to FIG. 2A or FIG. 3A), the clamp member 54 contacts the front surface 60c, while the pin member 11 and the shoulder member 12 are located at a default position and does not contact the front surface 60c.

Next, the tool driving control section 21 brings the shoulder member 12 of the rotating tool 51 into contact with the front surface 60c of the object to be welded 60, and starts to press (push) the object to be welded 60 (Step S102). At this time, although the shoulder member 12 contacts the front surface 60c while rotating, the shoulder member 12 may contact the front surface 60c without rotating and then, start to rotate. Then, the tool driving control section 21 sets the position where the shoulder member 12 contacts the front surface 60c of the object to be welded 60, as the press-fit reference point (Step S103).

Figure 6A:
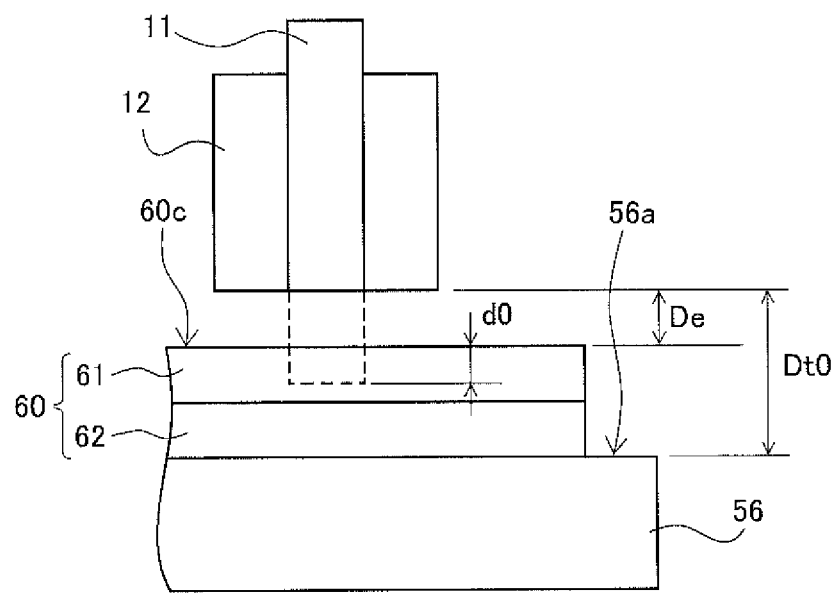
FIG. 6A and FIG. 6B are schematic views for describing setting of a press-fit reference point in the friction stir spot welding device in FIG. 1.

Specifically, for example, as shown in FIG. 6A, the object to be welded 60 is supported by the lining member 56, the front end of the pin member 11 is aligned with the front end of the shoulder member 12, and the front surface 60c of the object to be welded 60 and the front ends of the pin member 11 and the shoulder member 12 have a spacing De therebetween. Here, given that the distance between the front end of the rotating tool 51 (the pin member 11 and the shoulder member 12) and the support surface 56a of the lining member 56 is a "tool distance", in the state shown in FIG. 6A, a tool distance Dt0 includes the spacing De.

Given that it is attempted to press-fit the pin member 11 or the shoulder member 12 to a press-fit depth d0. At this time, the spacing De does not contribute to control of the press-fit depth d0. Thus, as shown in FIG. 6B, when the shoulder member 12 (and the pin member 11) is advanced, contacts the front surface 60c of the object to be welded 60 and stays there for a certain period, in FIG. 6B, the press-fit reference point setting section 22 sets a position of a tool distance Dt1 as the press-fit reference point. That is, the press-fit reference point setting section 22 corrects the position where the shoulder member 12 contacts and stays to a point of press-fit depth=0 (0 point), and using the 0 point as a reference, the tool driving control section 21 controls advancement or retraction of the pin member 11 (or the shoulder member 12 or the both).

Next, the tool driving control section 21 instructs movement of the pin member 11 from a default position to an inputted position (designated position) in a preheating stage (refer to FIG. 2B or FIG. 3B), and increases the pressurizing force of the shoulder member 12 to a predetermined value (Step S104). By continuing to rotate the pin member 11 and the shoulder member 12 in this state, the welded portion of the object to be welded 60 is preheated.

The default position, the inputted position, and the pressurizing force are parameters set for preheating, and suitable values are appropriately set depending on the specific configuration of the friction stir spot welding device 50A, and material, thickness, and shape, etc. of the object to be welded 60. Each parameter including the inputted position in each of below-mentioned stages is inputted to the tool driving control section 21 by the input section 32, and is stored in the memory section 31. According to the control stage, the tool driving control section reads the parameters from the memory section 31, and uses the read parameters for control.

Next, control by the tool driving control section 21 shifts to the tool control stage. In this embodiment, the tool control stage consists of a press-fit stage, a backfill stage, and a shaping stage (refer to FIG. 2C to FIG. 2E and FIG. 3C to FIG. 3E) and thus, the control will be described below using these three stages as an example. In the following description on the control, for convenience, the example shown in FIG. 2C to FIG. 2E, that is, the case where the pin member 11 is first press-fitted is used as an example.

First, the tool driving control section 21 moves the shoulder member 12 to a inputted position in the press-fit stage (refer to FIG. 2C), and also moves the pin member 11 to a inputted position in the press-fit stage (Step S105). Here, advancement and retraction of the shoulder member 12 and the pin member 11 to the respective inputted positions is controlled according to a value of a current applied to a motor of the tool driving section 53 (motor current value). For the shoulder member 12, when the shoulder member 12 is controlled according to the motor current value and reaches the inputted position, advancement or retraction is finished. The inputted positions of the pin member 11 or the shoulder member 12 in the press-fit stage are set to the position where the pin member 11 or the shoulder member 12 is pushed into (press-fitted into) the object to be welded 60, while the inputted position of the shoulder member 12 is set to a position where the shoulder member 12 is not pushed into the object to be welded 60 and presses the front surface 60c in the pressing state.

Next, in the backfill stage, the tool driving control section 21 moves the shoulder member 12 from the inputted position in the press-fit stage to a inputted position in the backfill stage (refer to FIG. 2D), and also moves the pin member 11 from the inputted position in the press-fit stage to the inputted position in the backfill stage (Step S106). As described above, providing that the front surface 60c of the object to be welded 60 can be sufficiently shaped in the next shaping stage, the backfill stage may be omitted.

Next, the tool driving control section 21 moves the shoulder member 12 to a inputted position in the shaping stage (refer to FIG. 2E), and also moves the pin member 11 to an inputted position in the shaping stage (Step S107). The inputted positions of the pin member 11 and the shoulder member 12 in the shaping stage are set to be the almost same position as the front surface 60c of the object to be welded 60 (generally, the press-fit reference point).

In the three tool control stages, the position of the pin member 11 and the shoulder member 12 is controlled by the tool driving control section 21 using the press-fit reference point as a reference. Thus, since advancement and retraction of the pin member 11 and the shoulder member 12 subjected to "0-point correction" of press-fit by the press-fit reference point setting section 22 is controlled, the tool driving control section 21 can suitably control the relative position of the pin member 11 with respect to the shoulder member 12, and can control without considering the spacing De (refer to FIG. 6B) between the front surface 60c of the object to be welded 60 and the rotating tool 51 (the pin member 11 and the shoulder member 12), the press-fit depth can be controlled at higher precision.

After that, the tool driving control section 21 moves the pin member 11 to a default position, and controls the tool driving section 53 to release contact of the shoulder member 12 with the object to be welded 60 (Step S108), to finish a series of process of friction stir spot welding.

Figure 6B:
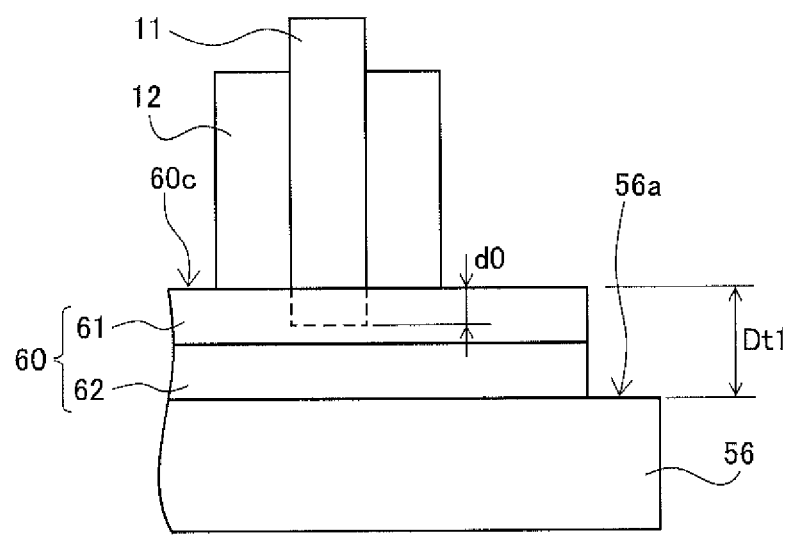

As shown in FIG. 6B, the tool distance Dt1 subjected to 0-point correction by the press-fit reference point setting section 22 corresponds to the thickness of the object to be welded 60. Accordingly, the friction stir spot welding device 50B in this embodiment can cause the shoulder member 12 to contact the object to be welded 60 for 0-point correction, measuring the thickness of the object to be welded 60.

In Steps S105 to S107 surrounded with a broken line Ct in FIG. 5, the tool driving control section 21 can control the press-fit depth of the pin member 11 and the shoulder member 12, and as shown in FIG. 4, read below-mentioned pressurizing force adjusting data from the memory section 31, and control the pressurizing force of the pin member 11 and the shoulder member 12.

The pressurizing force adjusting data may be any data as long as it can be used to control the tool driving section 53, and is preferably, data for adjusting the pressurizing force in the state where the rotating tool 51 is press-fitted into the object to be welded 60. In this embodiment, it is the above-mentioned motor current value. The motor current value is written in the form of database (or table) so as to address with change in the pressurizing force, and as described above, the pressurizing force/motor current databases Db1 to Db3 are stored in the memory section 31. The tool driving control section 21 reads the current value to adjust the motor current value, thereby controlling the pressurizing force of the pin member 11 and the shoulder member 12.

Especially in this embodiment, the number of the databases (or tables) for the motor current value, which are stored in the memory section 31, is three, not one. The pressurizing force/motor current database Db1 contains the motor current values for advancing or retracting the shoulder member 12 when advancement and retraction of the pin member 11 is stopped, the pressurizing force/motor current database Db2 contains the motor current values for advancing or retracting the shoulder member 12 when the pin member 11 is press-fitted into (pushed into) the object to be welded 60, and the pressurizing force/motor current database Db3 contains the motor current values for advancing or retracting the shoulder member 12 when the pin member 11 is pulled out of the object to be welded 60.

The tool driving control section 21 determines whether the pin member 11 is press-fitted, is pulled out, or is stopped without being press-fitted or pulled out, and reads the motor current value in the corresponding action from the three pressurizing force/motor current databases Db1 to Db3 to control the tool driving section 53. In the state where the object to be welded 60 is pressed, the pressurizing force changes according to the action of the pin member 11. Thus, by adjusting the pressurizing force according to the action of the pin member 11, the pressurizing force can be controlled more suitably.

Specifically, providing that the state where the pin member 11 is stopped (at stopping) is a reference state, in the state where the pin member 11 is press-fitted (at press-fit action), the pressurizing force becomes relatively high, and in the state where the pin member 11 is pulled out (at pull-out action), the pressurizing force becomes relatively low. Accordingly, at press-fit action, pull-out action, and stopping of the pin member 11, different motor current values are written in databases and stored in the memory section 31. The tool driving control section 21 determines the type of the action of the pin member 11, for example, on the basis of the moving speed and the moving direction of the pin member 11, and reads the motor current value corresponding to the determined action to adjust the pressurizing force.

The motor current values stored in the pressurizing force/motor current databases Db1 to Db3 are not specifically limited, and experimentally suitable values may be derived according to the type of the motor of the tool driving section 53, the change amount in the pressurizing force, the type of a gear mechanism transmitting the rotation driving power, or so on, and be written in databases (or tables). Only two databases may be stored, or four or more databases may be stored as needed.

In this embodiment, the moving speed and the moving direction of the pin member 11 are used as indicators for determining the type of the action of the pin member 11. However, the indicators are not limited to the moving speed and the moving direction, and may be any well-known parameter as long as it can properly determine the press-fit action, pull-out action, and stopping action. When the moving speed of the pin member 11 is used as the indicator, a speed deadband at switching between the press-fit action and the pull-out action can be set.

Provided that the state where the pin member 11 moves at a speed exceeding 0.05 mm/s is determined as the press-fit action (+ direction) or the pull-out action (− direction) on the basis of the moving direction, the range of −0.05 to +0.05 mm/s is set as the deadband. As a result, since the boundary for determining the press-fit action or the pull-out action is no longer a pinpoint threshold, the possibility that the database to be read frequently changes with speed change, leading to unstable adjustment of the pressurizing force can be suppressed or prevented.

As described above, the friction stir spot welding device 50A in this embodiment can suitably control the relative position of the pin member 11 with respect to the shoulder member 12, and especially, the press-fit depth of the pin member 11 and the shoulder member 12, or the pressurizing force of the pin member 11 onto the object to be welded 60. Therefore, excellent welding quality can be achieved at suitable precision according to welding conditions.

Although in this embodiment the configuration for controlling the press-fit depth and the pressurizing force has been described in detail, the configuration according to the present invention only needs to control the relative position of the pin member 11 with respect to the shoulder member 12 on the basis of the press-fit reference point and thus, for example, may control the moving speed of the pin member 11 and the shoulder member 12 in advancing and retracting directions.

Embodiment 2

Figure 7:
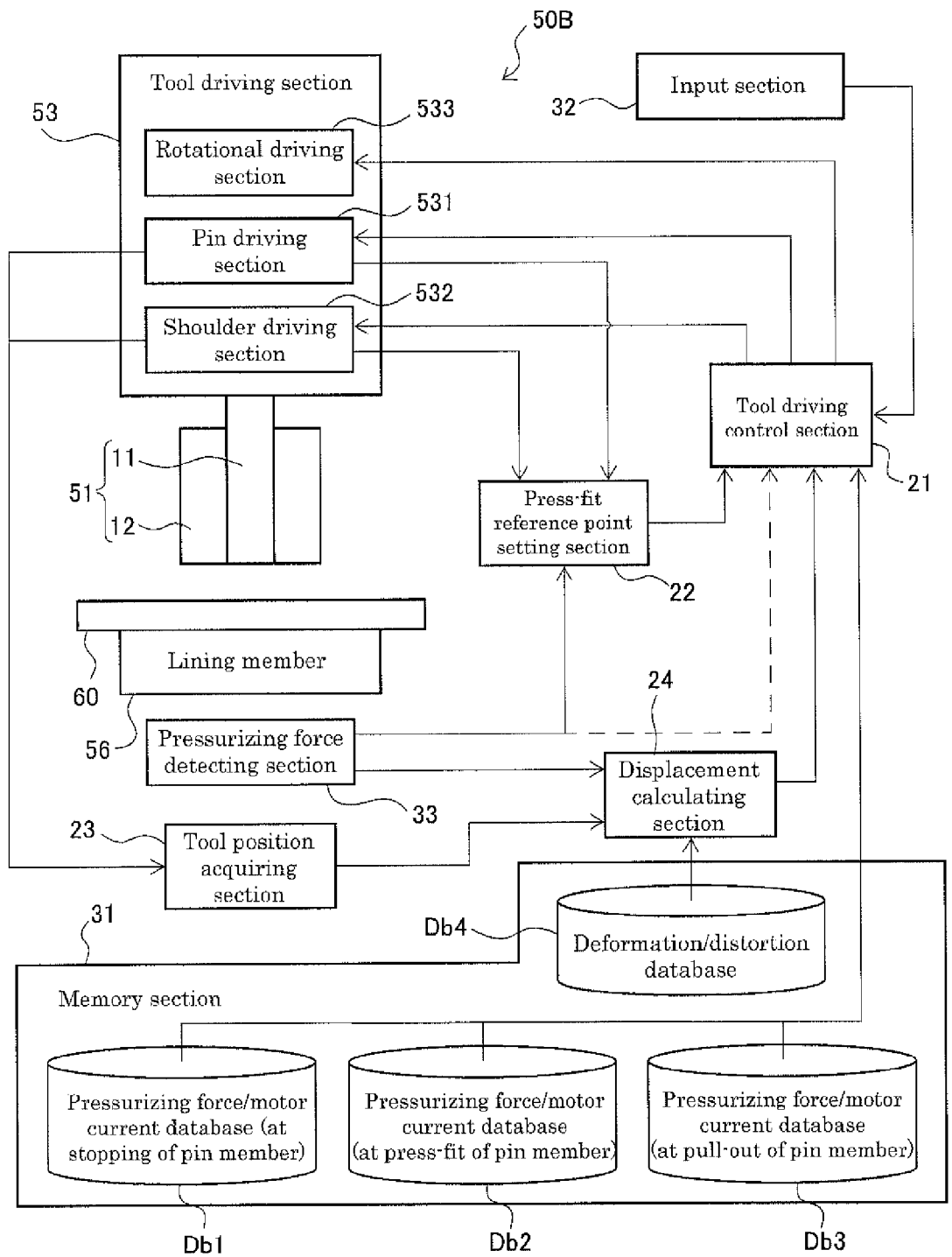
FIG. 7 is a block diagram showing functional configuration of a friction stir spot welding device in accordance with Embodiment 2 of the present invention.

Configuration of a friction stir spot welding device in accordance with Embodiment 2 of the present invention will be specifically described with reference to FIG. 7. As shown in FIG. 7, a friction stir spot welding device 50B in this embodiment is the same as the friction stir spot welding device 50A in Embodiment 1 in basic configuration, but is different from the friction stir spot welding device 50A in that a tool position acquiring section 23 and a displacement calculating section 24 are provided, and a deformation/distortion database Db4 is stored in the memory section 31.

The tool position acquiring section 23 acquires a tool position from the pin driving section 531 and the shoulder driving section 532. The tool position is a position of the front end of the pin member 11 or the front end of the shoulder member 12, and the tool driving control section 21 generates the tool distance based on the tool position. As described in Embodiment 1 (refer to FIG. 6A and FIG. 6B), the tool distance is defined as a distance between the front end of the pin member 11 or the front end of the shoulder member 12, and the support surface 56a.

The displacement calculating section 24 calculates various types of displacement (quantity of displacement), which affects advancement or retraction of the rotating tool 51, from the pressurizing force detected by the pressurizing force detecting section 33. Examples of the quantity of displacement includes quantity of displacement of the rotating tool, quantity of deformation of the lining support section 55, and quantity of distortion of the tool fixing section 52 and the tool driving section 53. However, the quantity of displacement is not limited to these, and may be backlash of the tool driving section 53. In this embodiment, the displacement calculating section 24 reads the quantity of displacement corresponding to the pressurizing force from the deformation/distortion database Db4 stored in the memory section 31.

In this embodiment, the pin driving section 531 and the shoulder driving section 532 each are formed of a well-known motor. The tool position acquiring section 23 can acquire the tool position by use of an encoder or the like provided in the motor, and the displacement calculating section 24 can calculate tool quantity of displacement on the basis of the pressurizing force acquired by the pressurizing force detecting section 33, and the deformation/distortion database Db4 recorded in the memory section 31. The tool driving control section 21 generates the tool distance based on the tool position, and corrects the tool distance according to the tool quantity of displacement.

The quantity of displacement of the rotating tool is defined as displacement between the thickness of the object to be welded 60, which is inputted as the welding condition, and the position of the contact surface 12a at the time when the pin member 11 or the shoulder member 12 contacts the front surface 60c of the object to be welded 60, in the state where the support surface 56a of the lining member 56 supports the object to be welded 60 (the stacked metal plates 61, 62). The position of the front end of the pin member 11 or the shoulder member 12 at the time when the pin member 11 or the shoulder member 12 contacts the front surface of the object to be welded 60 can be acquired by using the above-mentioned encoder (the shoulder driving section 532). Occurrence of the quantity of displacement of the rotating tool affects control of the position of the front end of the pin member 11 or the shoulder member 12.

The quantity of deformation of the lining support section 55 is the degree of deformation generated by bringing the rotating tool 51 into contact with the object to be welded 60 and press-fitting the rotating tool 51 into the object to be welded 60 to push the front surface 60c of the object to be welded 60. When deformation occurs in the lining support section 55, the relative position of the support surface 56a of the lining member 56 changes according to the quantity of deformation. The front surface 60c of the object to be welded 60, which is supported by the support surface 56a, is also displaced, affecting control of the press-fit depth of the pin member 11 and the shoulder member 12.

The quantity of distortion of the tool fixing section 52 and the tool driving section 53 is degree of distortion of members, parts, or mechanisms that constitute the tool fixing section 52 and the tool driving section 53, and is generated by reaction against a force of pressing the front surface 60c of the object to be welded 60 when the rotating tool 51 contacts and is press-fitted into the object to be welded 60. When distortion occurs in the tool fixing section 52 and the tool driving section 53, the position of the front ends of the pin member 11 and the shoulder member 12 changes according to the quantity of distortion, affecting control of the press-fit depth of the pin member 11 and the shoulder member 12.

The displacement calculating section 24 calculates the quantity of displacement on the basis of the welding condition inputted from the input section 32, positional information on the rotating tool 51, which is inputted from the pin driving section 531 and the shoulder driving section 532, etc., and the deformation/distortion database Db4 stored in the memory section 31, etc. The tool driving control section 21 corrects the tool distance on the basis of the quantity of displacement calculated by the displacement calculating section 24 and then, controls the tool driving section 53. The press-fit depth of the rotating tool 51 (the pin member 11, the shoulder member 12, or the both) with respect to the object to be welded 60 can be preferably controlled.

The configuration of the tool position acquiring section 23 and the displacement calculating section 24 is not specifically limited, and in this embodiment, as long as the tool driving control section 21 is formed of the CPU in the microcomputer as described above, the tool position acquiring section 23 and the displacement calculating section 24 may be functions of the tool driving control section 21. That is, the CPU as the tool driving control section 21 operates according to a program stored in the memory section 31 or another memory section to realize the tool position acquiring section 23 and the displacement calculating section 24. Alternatively, the tool position acquiring section 23 and the displacement calculating section 24 may be configured as a well-known logical circuit or like including a switching element, a subtractor, or a comparator, etc.

In this embodiment, the tool driving control section 21 may control driving of the rotating tool 51 by the output from the press-fit reference point setting section 22, the output from the displacement calculating section 24, and reading data of the pressurizing force/motor current databases Db1 to Db3 in the memory section 31, or as represented by a broken arrow in FIG. 7, by using the pressurizing force sent from the pressurizing force detecting section 33.

In the friction stir spot welding device 50B in this embodiment, the press-fit reference point setting section 22 can set the press-fit reference point to suitably control the press-fit depth of the pin member 11 and the shoulder member 12. This effect is the same as that in Embodiment 1. However, even when quantity of displacement such as quantity of displacement of the rotating tool, quantity of deformation of the lining support section 55, quantity of distortion of the tool fixing section 52 and the tool driving section 53, and backlash of the tool driving section 53 is present, the press-fit depth can be suitably controlled by correcting the tool distance acquired by the tool position acquiring section 23 with the quantity of displacement.

By correcting the tool distance with the quantity of displacement of the rotating tool, which is one of the displacement, the possibility that the rotating tool 51 penetrates the object to be welded 60 (hole) can be prevented or suppressed. As described in Embodiment 1, in the friction stir spot welding devices 50A and 50B, since the recess generated due to press-fit of the rotating tool 51 can be backfilled and shaped, such hole can be also backfilled. Nevertheless, it is desirable to avoid the hole as far as possible. When the press-fit reference point is greatly shifted due to the quantity of displacement of the rotating tool, the hole can occur. In this embodiment, however, the tool driving control section 21 can correct the tool distance with the quantity of displacement to prevent or suppress the hole.

Embodiment 3

Figure 8:
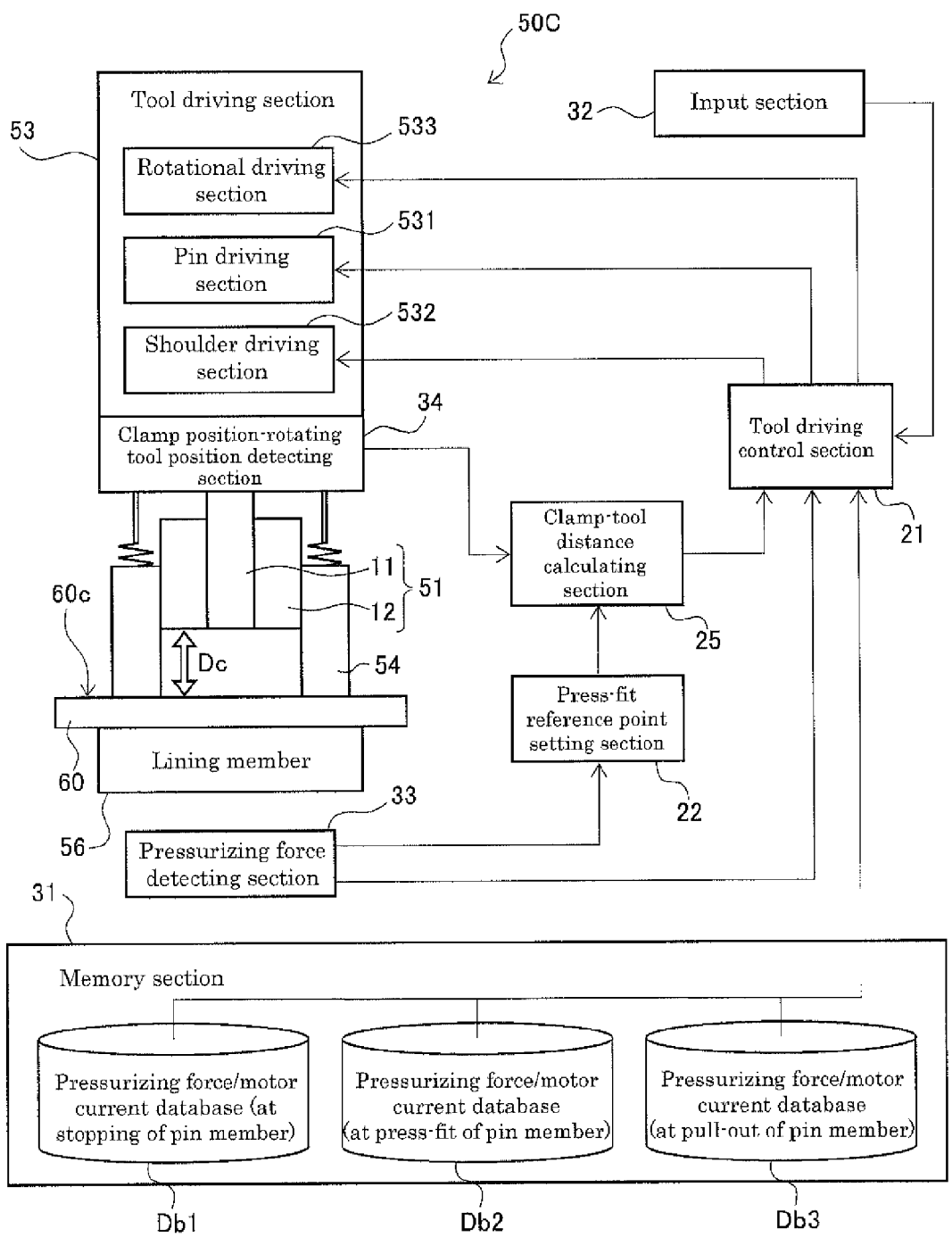
FIG. 8 is a block diagram showing functional configuration of a friction stir spot welding device in accordance with Embodiment 3 of the present invention.

Configuration of a friction stir spot welding device in accordance with Embodiment 3 of the present invention will be specifically described with reference to FIG. 8. As shown in FIG. 8, a friction stir spot welding device 50C in this embodiment is the same as the friction stir spot welding device 50A in Embodiment 1 in basic configuration, but is different from the friction stir spot welding device 50A in that a clamp position-rotating tool position detecting section 34 and a clamp-tool distance calculating section 25 are provided.

The clamp position-rotating tool position detecting section 34 detects the position of the front end of the clamp member 54. The clamp-tool distance calculating section 25 calculates a clamp-tool distance Dc (refer to a block arrow in FIG. 8) that is a distance between the position of the front end of the clamp member 54, which is detected by the clamp position-rotating tool position detecting section 34, and the front end of the pin member 11 or the shoulder member 12. As described above, the clamp member 54 is located outside the shoulder member 12, and serves to press the front surface 60c of the object to be welded 60. Accordingly, as long as the clamp member 54 presses the object to be welded 60, the front end of the clamp member 54 can be deemed to have the same position as the front surface 60c of the object to be welded 60.

Therefore, the tool driving control section 21 can suitably control the press-fit depth of the pin member 11 and the shoulder member 12 on the basis of the press-fit reference point set by the press-fit reference point setting section 22, and can correct quantity of displacement such as quantity of displacement of shoulder and quantity of distortion as described in Embodiment 2, with the clamp-tool distance Dc calculated by the clamp-tool distance calculating section 25 and then, adjust (set) the press-fit depth of the pin member 11 and the shoulder member 12. Accordingly, the press-fit depth can be suitably controlled.

Configuration of the clamp position-rotating tool position detecting section 34 is not specifically limited, and may be any well-known position sensor capable of detecting the front end of the clamp member 54. Configuration of the clamp-tool distance calculating section 25 is not also specifically limited, and as described in Embodiment 1 or 2, may be a function of the tool driving control section 21, or may be configured as a well-known logical circuit or like including such as a switching element, a subtractor, or a comparator, etc.

It is noted that, in the friction stir spot welding device 50C in accordance with Embodiment 3, the pressurizing force detecting section 33 is not essential constitute, but be used to acquire the pressurizing force/motor current databases Db1 to Db3 stored in the memory section 31, or can be used as redundant information of the press-fit reference point setting section 22, increasing convenience in controlling driving of the rotating tool 51. In the tool driving control section 21, the pressurizing force detecting section 33 may be used for feedback control from the pressurizing force detecting section 33 in place of the pressurizing force/motor current databases Db1 to Db3.

Embodiment 4

Figure 9:
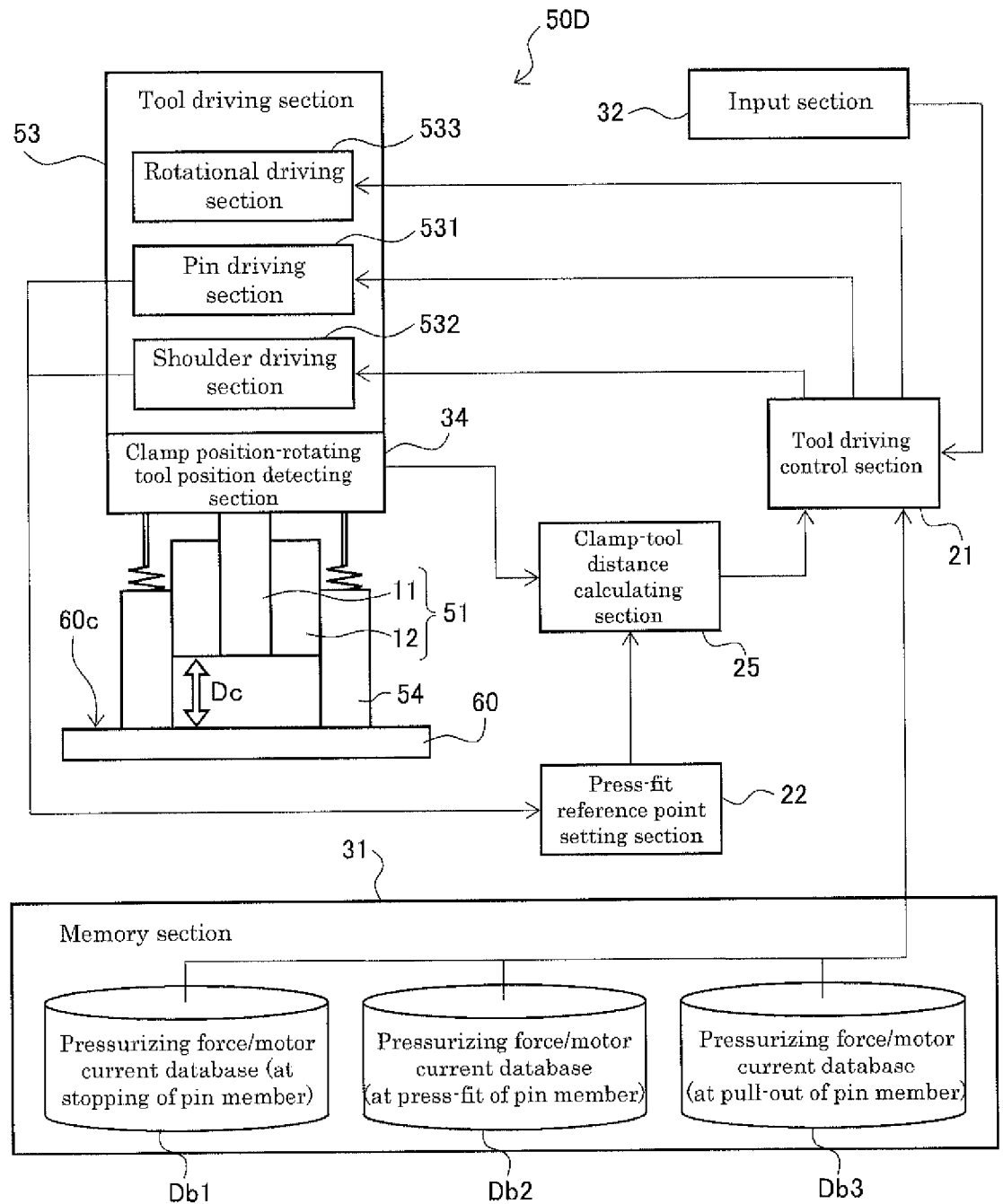
FIG. 9 is a block diagram showing functional configuration of a friction stir spot welding device in accordance with Embodiment 4 of the present invention.

Configuration of a friction stir spot welding device in accordance with Embodiment 4 of the present invention will be specifically described with reference to FIG. 9. As shown in FIG. 9, a friction stir spot welding device 50D in this embodiment is the same as the friction stir spot welding device 50C in Embodiment 3 in basic configuration, but is different from the friction stir spot welding device 50C in that no lining member 56 is provided, and no pressurizing force detecting section 33 is provided.

When the lining member 56 cannot support the back surface 60d of the object to be welded 60, for example, when a part of a three-dimensional structure is welded and thus, there is no space for the lining member 56, the lining member 56 cannot be used. When the object to be welded 60 has a sufficient stiffness, a lining may be unnecessary. Even in these cases, the present invention can be preferably applied.

In the example shown in FIG. 9, in the friction stir spot welding device 50D, in the state where the clamp member 54 contacts the object to be welded 60, the press-fit reference point setting section 22 sets the press-fit reference point, and the tool driving control section 21 controls advancement and retraction, and the press-fit depth of the rotating tool 51 (the pin member 11 and the shoulder member 12). At this time, even when the pressurizing force detecting section 33 is not provided, by previously storing the pressurizing force adjusting data in the memory section 31, the pressurizing force can be adjusted.

The present invention is not limited to the embodiments, and can be variously modified within the scope of Claims. Embodiments obtained by appropriately combining the technical means disclosed in the different embodiments and the modified examples also fall within the technical scope of the present invention.

Many modifications and other embodiments of the present invention will be apparent to those skilled in the art from the above description. Therefore, the above description should be interpreted to be only illustrative, and serves to teach the best mode for carrying out the present invention to those skilled in the art. Details of the configuration and/or function can be substantially changed without deviating from the spirit of the present invention.

INDUSTRIAL APPLICABILITY

The present invention can suitably control the position of the pin member and the shoulder member especially in double-acting friction stir spot welding and therefore, can be applied to various fields using friction stir spot welding widely and preferably.

DESCRIPTION OF REFERENCE SIGNS

11: Pin member
12: Shoulder member
21: Tool driving control section
22: Press-fit reference point setting section
23: Tool position acquiring section
24: Displacement calculating section
25: Clamp-tool distance calculating section
31: Memory section
33: Pressurizing force detecting section
34: Clamp position-rotating tool position detecting section
50A, 50B, 50C, 50D: Friction stir spot welding device
51: Rotating tool
53: Tool driving section
54: Clamp member
55: Lining support section
56: Lining member
60: Object to be welded

The invention claimed is:

1. A friction stir spot welding device configured to weld an object by partial stirring of a rotating tool, the device comprising:
a cylindrical pin member as the rotating tool, the pin member being configured to rotate about an axis of the pin member and advance and retract along the axis;
a tubular shoulder member configured to surround the pin member, rotate coaxially with the pin member, and advance and retract along the axis;
a tool driving section configured to cause each of the pin member and the shoulder member to advance and retract along the axis;
a lining member including a support surface, the support surface being configured to support the object during the welding of the object;
a press-fit reference point setting section configured to set a press-fit reference point based on a distance between (i) the pin member and the support surface or (ii) the shoulder member and the support surface when the pin member or the shoulder member contacts a surface of the object; and
a tool driving control section configured to control the tool driving section, wherein
the tool driving control section controls (i) a relative position of the pin member with respect to the shoulder member or (ii) a relative position of the shoulder member with respect to the pin member on the basis of the press-fit reference point to thereby control a press-fit depth of the pin member or the shoulder member into the object.

2. The friction stir spot welding device according to claim 1, further comprising:
a displacement calculating section configured to calculate a quantity of displacement of a front end of the pin member or the shoulder member, wherein
the tool driving control section is configured to correct the press-fit depth of the pin member or the shoulder member based on the quantity of displacement.

3. The friction stir spot welding device according to claim 1, further comprising:
a clamp member located outside the shoulder member, the clamp member being configured to press the object;
a clamp position detecting section configured to detect a position of a front end of the clamp member; and
a clamp-tool distance calculating section configured to calculate a distance between the front end of the clamp member, which is detected by the clamp position detecting section, and the front end of the pin member or the shoulder member, wherein
the tool driving control section is configured to adjust the press-fit depth of the pin member or the shoulder member based on the distance calculated by the clamp-tool distance calculating section.

4. The friction stir spot welding device according to claim 1, further comprising a memory section, wherein
the memory section is configured to store pressurizing force adjusting data for adjusting pressurizing force of the rotating tool when press-fitted into the object, and
the tool driving control section is configured to read the pressurizing force adjusting data from the memory section to control the pressurizing force.

5. The friction stir spot welding device according to claim 4, wherein
the pressurizing force adjusting data corresponds to a current value applied to a motor of the tool driving section and is stored in the memory section, and
the tool driving control section is configured to adjust the current value to control the pressurizing force.

6. The friction stir spot welding device according to claim 4, wherein
the memory section is configured to individually store the pressurizing force adjusting data for each of (i) a press-fit action of press-fitting the pin member into the object, (ii) a pull-out action of pulling the pin member out of the object, and (iii) a stopped state of the pin member, and
the tool driving control section is configured to determine whether the action of the pin member is the press-fit action, the pull-out action, or the stopped state, and to read the pressurizing force adjusting data corresponding to the determined action from the memory section to control the tool driving section.

7. A friction stir spot welding method using a friction stir spot welding device including:
a cylindrical pin member configured to rotate about an axis of the pin member and advance and retract along the axis;
a tubular shoulder member configured to surround the pin member, rotate coaxially with the pin member, and advance and retract along the axis such that the pin member and the shoulder member are advanceable and retractable to weld an object having a front surface facing the pin member and the shoulder member by partial stirring; and
a lining member including a support surface, the support surface being configured to support the object during the welding of the object, the method comprising:
  setting a press-fit reference point based on a distance between (i) the pin member and the support surface or (ii) the shoulder member and the support surface when the pin member or the shoulder member contacts the object; and
  controlling a relative position of the pin member with respect to the shoulder member or a relative position of the shoulder member with respect to the pin member based on the press-fit reference point to thereby control a press-fit depth of the pin member or the shoulder member into the object.

8. The friction stir spot welding method according to claim 7, further comprising calculating a quantity of displacement of a front end of the pin member or the shoulder member and correcting the press-fit depth based on the quantity of displacement.

9. The friction stir spot welding method according to claim 7, further comprising:
  pressing the object with a clamp member that is located outside of the shoulder member;
  calculating a distance between a front end of the clamp member and a front end of the pin member or the shoulder member; and
  adjusting the press-fit depth based on the calculated distance.

10. The friction stir spot welding method according to claim 7, further comprising:
  storing, in a memory section, pressurizing force adjusting data for adjusting pressurizing force of the pin member when press-fitted into the object; and
  reading the pressurizing force adjusting data from the memory section to control the pressurizing force.

11. The friction stir spot welding device according to claim 1, wherein the press-fit reference point setting section is configured to set the press-fit reference point before the pin member or the shoulder member is press-fitted into the object.

12. The friction stir spot welding device according to claim 11, wherein the press-fit reference point setting section is configured to set, as the press-reference point, a position of the pin member or the shoulder member that contacts the surface of the object in a state in which the pin member or the shoulder member is applying a pressurizing force to the object in a pre-heating stage.

13. The friction stir spot welding device according to claim 1, wherein the press-fit reference point is set as a 0-point of the press-fit depth of the pin member or the shoulder member into the object.

14. The friction stir spot welding method according to claim 7, further comprising setting the press-fit reference point before the pin member or the shoulder member is press-fitted into the object.

15. The friction stir spot welding method according to claim 14, further comprising setting, as the press-reference point, a position of the pin member or the shoulder member that contacts the surface of the object in a state in which the pin member or the shoulder member is applying a pressurizing force to the object in a pre-heating stage.

16. The friction stir spot welding method according to claim 7, further comprising setting the press-fit reference point as a 0-point of the press-fit depth of the pin member or the shoulder member into the object.

* * * * *